(12) United States Patent
Lauri et al.

(10) Patent No.: US 11,229,215 B2
(45) Date of Patent: Jan. 25, 2022

(54) METHOD OF PROCESSING AN INTACT ANIMAL CARCASS

(71) Applicants: Luana Lauri, Woodbridge (CA); Teodoro Lauri, Bradford (CA); Fabrizio Lauri, Woodbridge (CA)

(72) Inventors: Luana Lauri, Woodbridge (CA); Teodoro Lauri, Bradford (CA); Fabrizio Lauri, Woodbridge (CA)

(73) Assignee: L & M MEATS IP HOLDINGS INC., Gilford (CA)

( * ) Notice: Subject to any disclaimer, the term of this patent is extended or adjusted under 35 U.S.C. 154(b) by 0 days.

(21) Appl. No.: 16/811,314

(22) Filed: Mar. 6, 2020

(65) Prior Publication Data

US 2020/0352180 A1 Nov. 12, 2020

(30) Foreign Application Priority Data

May 10, 2019 (CA) ...................................... 3043088

(51) Int. Cl.
*A22B 5/00* (2006.01)
*A22B 5/08* (2006.01)

(52) U.S. Cl.
CPC .............. *A22B 5/08* (2013.01); *A22B 5/0082* (2013.01)

(58) Field of Classification Search
CPC .... A22B 5/0082; A22B 5/0005; A22B 5/0076
(Continued)

(56) References Cited

U.S. PATENT DOCUMENTS 2,783,496 A 3/1957 Thomas
3,397,423 A 8/1968 Burch
(Continued)

FOREIGN PATENT DOCUMENTS

FR 2549699 2/1985
FR 2549699 A1 2/1985
(Continued)

OTHER PUBLICATIONS

Australian Examination Report for Application No. 2020201512 dated May 26, 2020.
(Continued)

*Primary Examiner* — Richard T Price, Jr.
(74) *Attorney, Agent, or Firm* — Tarolli, Sundheim, Covell & Tummino LLP

(57) ABSTRACT

A method for processing an intact animal carcass comprises submerging a bled animal carcass in scalding water for at least 20 seconds to produce a scalded animal carcass, de-hairing the scalded animal carcass to produce a de-haired animal carcass, suspending the de-haired animal carcass, burning an epidermal layer of the de-haired animal carcass while suspended so that a majority of the epidermal layer is charred so as to produce a burnt animal carcass, pressure washing the burnt animal carcass to produce a pressure-washed animal carcass, eviscerating the pressure-washed animal carcass to produce an eviscerated animal carcass, internally washing the eviscerated animal carcass to produce an internally washed animal carcass, and chilling the internally washed animal carcass to a temperature of between 0 degrees Celsius and about 4 degrees Celsius to produce a chilled animal carcass.

14 Claims, 1 Drawing Sheet

(58) Field of Classification Search
USPC .............................................. 452/71, 73–75
See application file for complete search history.

(56) References Cited

U.S. PATENT DOCUMENTS

| | | | |
|---|---|---|---|
| 3,631,563 A | | 1/1972 | Snowden |
| 3,729,773 A | | 5/1973 | Dillon |
| 5,607,349 A | | 3/1997 | Karubian et al. |
| 5,980,375 A | * | 11/1999 | Anderson ............ A22B 5/0082 452/77 |
| 5,980,377 A | * | 11/1999 | Zwanikken ............ A22B 5/007 452/158 |
| 6,783,451 B2 | | 8/2004 | Aandewiel et al. |
| 8,002,614 B2 | | 8/2011 | McNaughton et al. |
| 8,062,104 B2 | | 11/2011 | Summerfield et al. |
| 8,905,826 B2 | * | 12/2014 | Hayzlett .................. A22B 5/08 452/72 |
| 2007/0141974 A1 | * | 6/2007 | McNaughton ........... A23B 4/20 452/176 |
| 2011/0189338 A1 | * | 8/2011 | McNaughton ......... A22C 17/08 426/2 |

FOREIGN PATENT DOCUMENTS

| | | |
|---|---|---|
| FR | 2659529 A1 | 9/1991 |
| GB | 2144022 A | 2/1985 |
| GB | 2219380 A | 12/1989 |
| GB | 2533196 A | 6/2016 |
| SU | 413932 | 11/1974 |
| WO | 9814066 A1 | 4/1998 |
| WO | 2011128533 A2 | 10/2011 |

OTHER PUBLICATIONS

New Zealand Office Action for Application No. 762203 dated Jun. 4, 2020.
Canadian Office Action for Application No. 3043088 dated Sep. 26, 2019.
Extended European Search Report for Application No. 20169470.0-1011 dated Jul. 27, 2020.
"Abattoirs Code of Good Practice: Critical Design, Operational and Equipment Guidlines for Licensed Abattoirs", BC Centre for Disease Control; Nov. 2012, pp. 1-79.
"Guidelines for slaughtering, meat cutting, and further processing", FAO Animal Production and Health Paper 91; Food and Agricultural Organization of the United Nations Rome, Apr. 11, 2011, pp. 1-227.
"Ontario Regulation 31/05: Meat", Food Safety and Quality Act, 2001, pp. 1-101.
"Scalding and Burning of Sheep, Goats, and Llamas", protocol of Little Britain Meat Packers (2012) Ltd. approved by Ontario Ministry of Agriculture, Food and Rural Affairs, Food Inspection Branch, Brighton Area on Jun. 5, 2015.
"Scalding and Burning of Sheep, Goats, and Llamas", protocol of Little Britain Meat Packers (2012) Ltd. approved by Ontario Ministry of Agriculture, Food and Rural Affairs, Food Inspection Branch, Brighton Area on Oct. 10, 2018.
Beef Cattle Production and Trade, Editors: David Cottle and Lewis Kahn 2014 published by CSIRO Publishing, Collingwood VIC, Australia, p. 28.
Outlines by G. R. Acuff, Ph.D., Professor of Food Microbiology, Texas A & M University, of pathogen reduction dialogue held May 6, 2002.

* cited by examiner

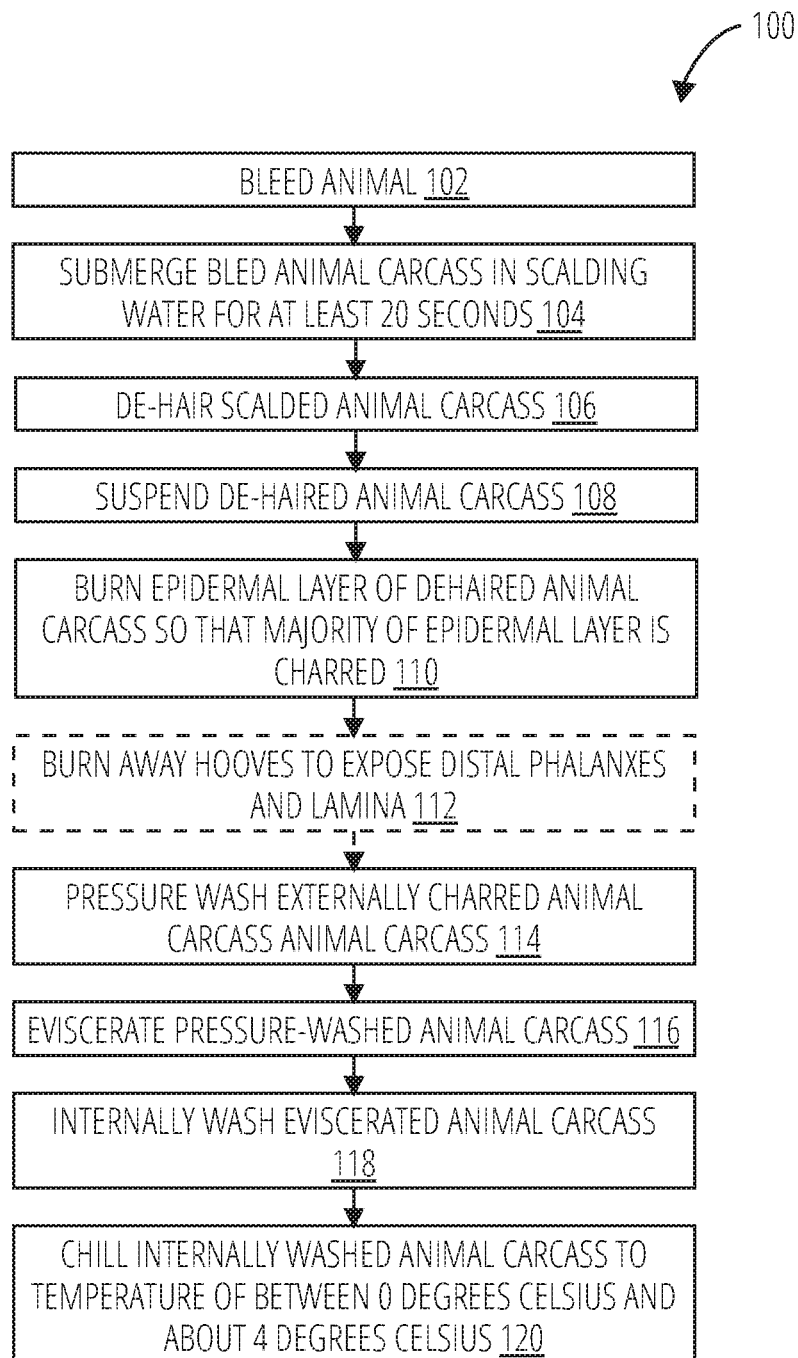

METHOD OF PROCESSING AN INTACT ANIMAL CARCASS

RELATED APPLICATIONS

The present invention is a Nonprovisional Application under 35 USC 111(a), claiming priority to Serial No. CA 3043088, filed on 10 May 2019, the entirety of which is incorporated herein by reference.

BACKGROUND

Many traditional cultures, including some found in Africa, would kill an animal and then immediately roast it, essentially intact, for consumption. This process results in an animal carcass with burnt outer skin. Immigrants to North America who wish to preserve their culture often seek to continue this practice, but may be stymied by government regulations relating to the proper processing of animal carcasses. Therefore, it is desirable to develop a method for processing an intact animal carcass that is consistent with sanitary practice.

BRIEF SUMMARY

The present disclosure describes a method for processing an intact animal carcass consistent with sanitary practice. In one aspect, the method comprises submerging a bled animal carcass in scalding water for at least 20 seconds to produce a scalded animal carcass, de-hairing the scalded animal carcass to produce a de-haired animal carcass, suspending the de-haired animal carcass, burning an epidermal layer of the de-haired animal carcass while suspended so that a majority of the epidermal layer is charred so as to produce an externally charred animal carcass, pressure washing the externally charred animal carcass to produce a pressure-washed animal carcass, eviscerating the pressure-washed animal carcass to produce an eviscerated animal carcass, internally washing the eviscerated animal carcass to produce an internally washed animal carcass, and chilling the internally washed animal carcass to a temperature of between 0 degrees Celsius and about 4 degrees Celsius to produce a chilled animal carcass.

BRIEF DESCRIPTION OF THE SEVERAL VIEWS OF THE DRAWINGS

To facilitate understanding of the present disclosure, reference is made to the following FIGURE.

FIG. 1 illustrates a method for processing an intact animal carcass in accordance with one embodiment.

DETAILED DESCRIPTION

An illustrative method, indicated generally by reference 100, for processing an intact animal carcass will now be described with reference to FIG. 1. It is to be appreciated that the method 100 shown in FIG. 1 is merely illustrative and is not intended to be limiting.

The method 100 shown in FIG. 1 is applied to an initially intact animal carcass, that is, an animal carcass that includes the feet, the head and the viscera. The feet and head remain attached to the animal carcass throughout the entirety of the method 100, although the viscera are removed during the method 100. The animal carcass may be, for example, an ungulate carcass such as a goat carcass, a pig carcass or a cow carcass, or a rodent carcass, for example a capybara carcass. These are merely illustrative examples, and are not intended to imply any limit as to the types of animal carcasses to which the present disclosure may be applied. The method 100 may be carried out by human personnel with the aid of machines, or in an entirely automated manner, or by way of a combination of human personnel and automation. The method 100 is carried out in the order shown in FIG. 1.

In block 102, an animal is bled to produce a bled animal carcass. In preferred embodiments, the animal is a live animal and bleeding the animal kills the animal. For example, a blow can be delivered to the head of a living animal with a captive bolt to stun the animal and then the animal, while stunned, can be humanely bled to death, such as by penetrating the animal at a suitable location (e.g. the jugular vein at the throat) with a clean, sanitized knife and allowing a sufficient quantity of blood to drain. This results in a bled animal carcass, with the head and feet still attached. Any suitable bleeding technique may be used, and instead of humanely bleeding the stunned animal while alive, an intact animal carcass may be bled after a humane death. Alternatively, other suitable techniques may be used for humanely killing the animal, or the animal may be humanely killed elsewhere and then the intact animal carcass may be transported to the location where the method 100 is to be performed. In some embodiments, bleeding may be performed before transport.

In block 104, the bled animal carcass is submerged in scalding water, preferably between about 60-80 degrees Celsius, more preferably between about 65-75 degrees Celsius and still more preferably between about 68-70 degrees Celsius, for at least 20 seconds, preferably for between 30 to 60 seconds and most preferably for between 30 to 45 seconds. This results in a scalded animal carcass in which the hair is less tightly embedded in the epidermal layer of the skin. In some embodiments, the scalding water may be saltwater.

In block 106, the scalded animal carcass is de-haired. This may be accomplished, for example, by tumbling the scalded animal carcass in a de-hairing machine. The result of block 106 is a de-haired animal carcass which is then suspended at block 108. For example, a crossbar may be driven through the hind legs of the de-haired animal carcass, such as at the proximal side of the calcaneus (ankle joint), and then the crossbar may be hung from a hook depending from the ceiling of the abattoir in which the method 100 is performed. The hook may depend from a rail system to facilitate movement of the animal carcass. Optionally, at this stage, any remaining small patches of hair that were not removed at block 106 can be scraped away, for example using a clean, sanitized, dull knife.

In block 110, while the de-haired animal carcass is suspended, the epidermal layer of the de-haired animal carcass is burned so that a majority of the epidermal layer is charred. The term "majority", as used in this context, refers to outer surface area. If the animal was bled from the cervical (neck) are, this area may be subjected to more significant charring. The burning is preferably performed with a propane torch operating at up to 500,000 BTU. For example, a handheld propane torch may be used by a human operator, or one or more propane torches may be mounted on a specialized machine. Other suitable burning methods may also be used. If hair remains on the de-haired animal carcass and is charred, the charred hair can be scraped away and the underlying epidermal layer further charred. The result of block 110 is an externally charred animal carcass. Where the animal carcass is an ungulate carcass, in optional block 112 the feet are burned to an extreme char such that the corneum (hooves) are burned away to expose the distal phalanx bones and lamina. In this context, "burned away" means that the hooves are burned sufficiently to be knocked free of the feet. In block 114, the externally charred animal carcass, while still suspended, is pressure washed. Preferably, the pressure washing is performed using clean water (e.g. from a well with chlorination, or a municipal water supply) at a temperature between about 4 degrees and about 12 degrees Celsius, preferably toward to cooler end of this range. Preferably, the pressure washing is performed using water at a pressure between about 1,000 and about 1,800 PSI, preferably between about 1,200 and about 1,600 PSI and more preferably about 1,500 PSI and may be performed using conventional pressure-washing apparatus, suitably sanitized. The pressure-washing at block 114 removes any excess char resulting from the burning performed at block 110, leaving a pressure-washed animal carcass.

In block 116, the pressure-washed animal carcass is eviscerated, that is, the pressure-washed animal carcass is cut open and the viscera, including the lungs, heart, liver, stomach and intestines, are removed, resulting in an eviscerated animal carcass. Preferably, the pressure-washed animal carcass is eviscerated while hanging for sanitary reasons. Evisceration may be performed by hand, using a knife to cut the ventral side of the thorax in the caudal direction into the abdomen, and a brisket saw or other suitable tool may be used to open the ribcage, and the viscera then removed by hand. Automated or partially automated evisceration is also contemplated. Optionally, at this stage any charred hair remaining on the pressure-washed animal carcass can be trimmed away by removing a portion of the epidermal layer underlying the charred hair. In block 118, the eviscerated animal carcass is internally washed so that there is now an internally washed animal carcass. Internal washing may comprise flushing the thoracic-abdominal cavity with cold, clean water and may further comprise flushing water through the nose and throat. The water used for internal washing is preferably at a temperature between about 4 degrees and about 12 degrees Celsius, preferably toward to cooler end of this range. Then, in block 120, the internally washed animal carcass is chilled to a temperature of between 0 degrees Celsius and about 4 degrees Celsius, for example in a commercial refrigerator.

Optionally, after chilling the internally washed animal carcass, the feet and/or the head may be cut off the chilled animal carcass; preferably the feet and the head are left on the chilled animal carcass. Additionally, if desired, the ears may be cut off, for example before bleeding, or after bleeding but before scalding, or when trimming away charred hair or at another suitable stage in the process.

While the presently described methods may be applied to cows without departing from sanitary standards, certain jurisdictions may have additional processing requirements relating to cows because of concerns with bovine spongiform encephalitis (BSE), colloquially known as "mad cow disease". Thus, a cow processed according to the presently described methods would be sanitary, even if other regulations prohibited the sale of processed beef carcasses that retain the head and spine for reasons unrelated to sanitary standards. Accordingly, the presently described methods may be applied in such jurisdictions as may now or in the future permit the sale of intact beef carcasses including the head and spine, but should of course not be used where such sale is prohibited.

Certain illustrative embodiments have been described by way of example. Those of skill in the art will appreciate that various adaptations and modifications can be made without departing from the scope of the claims.

What is claimed is:

1. A method for processing an intact animal carcass, the method comprising, in order, after an animal has been bled to produce a bled animal carcass and while a head and feet of the bled animal carcass remain attached:
    (i) submerging the bled animal carcass in scalding water for at least 20 seconds to produce a scalded animal carcass;
    (ii) de-hairing the scalded animal carcass to produce a de-haired animal carcass;
    (iii) suspending the de-haired animal carcass;
    (iv) burning an epidermal layer of the de-haired animal carcass while suspended so that a majority of the epidermal layer is charred so as to produce an externally charred animal carcass;
    (v) pressure washing the burnt animal carcass while suspended to produce a pressure-washed animal carcass;
    (vi) eviscerating the pressure-washed animal carcass to produce an eviscerated animal carcass;
    (vii) internally washing the eviscerated animal carcass to produce an internally washed animal carcass; and
    (vii) chilling the internally washed animal carcass to a temperature of between 0 degrees Celsius and about 4 degrees Celsius to produce a chilled animal carcass.

2. The method of claim 1, wherein de-hairing the scalded animal carcass comprises tumbling the scalded animal carcass in a de-hairing machine.

3. The method of claim 2, further comprising, after tumbling the scalded animal carcass in the de-hairing machine, scraping away remaining hair.

4. The method of claim 1, further comprising trimming away charred hair by removing a portion of the epidermal layer underlying the charred hair.

5. The method of claim 1, further comprising cutting ears off of the head.

6. The method of claim 1, wherein the intact animal carcass is an ungulate carcass.

7. The method of claim 6, further comprising, before pressure washing the burnt animal carcass, burning away hooves to expose distal phalanxes thereof.

8. The method of claim 6, wherein the ungulate carcass is one of a goat carcass, a pig carcass and a cow carcass.

9. The method of claim 1, wherein the intact animal carcass is a rodent carcass.

10. The method of claim 9, wherein the rodent carcass is a capybara carcass.

11. The method of claim 1, further comprising, after chilling the internally washed carcass, cutting the feet off the chilled animal carcass.

12. The method of claim 1, further comprising, after chilling the internally washed carcass, cutting the head off the chilled animal carcass.

13. The method of claim 1, further comprising bleeding the animal.

14. The method of claim 13, wherein the animal is a live animal and bleeding the animal kills the animal.

* * * * *

UNITED STATES PATENT AND TRADEMARK OFFICE
CERTIFICATE OF CORRECTION

PATENT NO. : 11,229,215 B2
APPLICATION NO. : 16/811314
DATED : January 25, 2022
INVENTOR(S) : Luana Lauri et al.

Page 1 of 1

It is certified that error appears in the above-identified patent and that said Letters Patent is hereby corrected as shown below:

In the Claims

Column 4, Claim 1, Line 29 reads:
"(vii)"

Should read:
-- (viii) --

Signed and Sealed this
Twenty-seventh Day of September, 2022

Katherine Kelly Vidal
*Director of the United States Patent and Trademark Office*